United States Patent [19]
Roberts

[11] 3,811,410
[45] May 21, 1974

[54] ANIMAL WATER-CLOSET

[76] Inventor: Dolly A. Roberts, 161 Flaming Dr., Clearwater, Fla. 33516

[22] Filed: Aug. 24, 1972

[21] Appl. No.: 283,401

[52] U.S. Cl. .................................. 119/1, 4/100
[51] Int. Cl. ................................... A01k 29/00
[58] Field of Search .................. 119/1; 4/100, 101

[56] References Cited
UNITED STATES PATENTS
| | | | |
|---|---|---|---|
| 3,656,457 | 4/1972 | Houston | 119/1 |
| 3,523,305 | 8/1970 | Zorn | 4/100 |
| 2,603,794 | 7/1952 | Bokser | 4/101 X |

Primary Examiner—Antonio F. Guida
Assistant Examiner—J. N. Eskovitz
Attorney, Agent, or Firm—Kenyon & Kenyon Reilly Carr & Chapin

[57] ABSTRACT

A water-closet for household pets, such as cats and dogs, includes a receptacle, a platform for supporting the animal, and a water flushing system for the receptacle which is activated by an electromechanical control valve. Photoelectric means are provided at the entry end of the platform for sensing the presence of an animal in the water-closet. A signal is generated by the photoelectric means when the animal interrupts the light beam, which signal activates the water flushing system. A time delay circuit is provided between the photoelectric means and control valve so as to delay actuation of water flushing for a predetermined and adjustable period of time and thereby avoid flushing while the animal is in the presence of the water-closet.

1 Claim, 3 Drawing Figures

3,811,410

ANIMAL WATER-CLOSET

BACKGROUND OF THE INVENTION

This invention relates generally to a water-closet for small household animals, and more particularly to one wherein flushing is accomplished automatically.

Heretofore, there have been numerous attempts to provide water-closets or toilets for household pets such as dogs or cats. These prior art water-closets were intended primarily for home use, but have never achieved a great deal of acceptance primarily because of their inadequacies in design and their failure to provide the necessary considerations for the animal.

In order for an animal water-closet to perform satisfactorily, several considerations must be kept in mind. It is desirable from a marketing point of view to provide a water-closet which will accommodate large variations in the size and weight of the animal so that a single unit may be provided for dogs, cats, puppies and kittens. One of the prior art suggestions has been to provide a weight sensitive device which would activate the flushing action. This system, however, has drawbacks in that it cannot accommodate, very readily, household animals such as those previously discussed having different weights. Further, the weight detection technique requires pre-loading to offset the basic weight of the unit. The preload would vary and require adjustments in time, resulting in unreliable operation.

An additional consideration is that certain animals, such as cats, have a tendency to enter and leave their toilets several times before actually utilizing it. The prior art systems which have been designed to provide flushing immediately after the animal leaving the toilet present serious drawbacks in this respect. For instance, in such a system if the animal were to enter a second time, the toilet would be in the process of being flushed due to the previous exit. This would of course cause the animal to be hesitant to again approach the unit.

By the means disclosed herein, an animal water-closet is provided which can accommodate large variations in the size and weight of the animals, such as exist with dogs, cats, puppies and kittens. Additionally, this system is so designed that the flushing action only takes place after a predetermined period of time, making it unlikely that the animal will return and find the toilet in the flushing stage.

SUMMARY OF THE INVENTION

Briefly stated, the invention herein is directed to an animal water-closet which includes a receptacle or bowl and a platform disposed adjacent the receptacle for supporting the animal. A water flushing means is provided and connected to a control valve. At the portion of the platform through which the animal enters, a sensing means detects the animal and emits a detection signal in response thereto. The emitted detection signal is transmitted to a control valve actuating means. In order to prevent immediate flushing upon generating of the signal by the sensing means, a time delay circuit is provided between the sensing means and the control valve actuating means. This time delay circuit delays actuation of the flushing means for a predetermined period of time so that the flushing does not take place until the animal has left the water-closet.

The sensing means, as disclosed, is in the form of a photoelectric system having a light source constantly emitting a beam of light against a light sensitive cell. The light beam is positioned to be interrupted by the presence of an animal on the platform. Once the animal leaves, the previously interrupted light beam is again sensed by the light sensitive cell which then generates a signal. The signal is routed through the time delay circuit so that actuation of the solenoid valve to commence flushing is delayed a period of time sufficient to allow the animal to leave the area. The circuitry is preferably also provided with a second time delaying means adapted to cause the flushing phase to continue for a predetermined and adjustable period of time.

The animal closet as described herein is adapted to be installed within the home by means of normal plumbing connections. The system is advantageous in that it can acommodate various sizes and weights of animals. Further, the system is fully automatic and of a type which finds wide acceptance by the animal. Particular advantages are found in that the system is so designed that actuation of the flushing means will generally not occur while the animal is in the presence of the water-closet. This, of course, eliminates any tendency of the animal becoming hesitant to use the water-closet.

Accordingly, it is an object of this invention to provide an animal water-closet adapted to accommodate animals having varying sizes and weights.

It is another object of this invention to provide a fully automatic water-closet for use in the home by household pets.

It is a further object of this invention to provide a water-closet for small animals wherein the flushing action is delayed for a sufficient period of time so that the animal will generally not be in the presence of the water-closet when the flushing occurs.

These and other objects, advantages and features of the invention will become more apparent from the following description taken in conjunction with the accompanying drawings.

BRIEF DESCRIPTION OF THE DRAWINGS

FIG. 3 is a schematic diagram of the electric circuit of another embodiment of this invention.

DESCRIPTION OF THE PREFERRED EMBODIMENT

Figure 1:
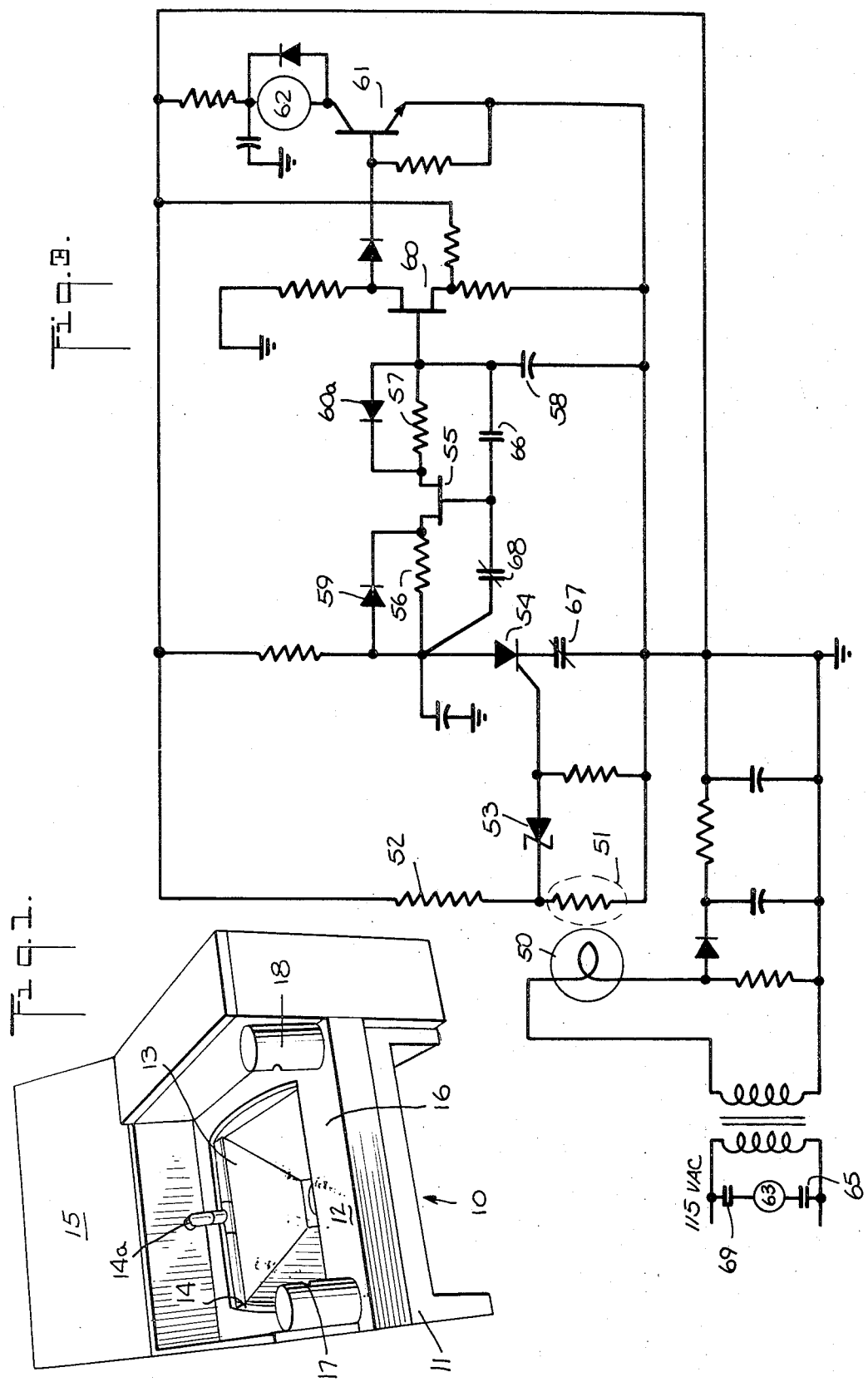
FIG. 1 is a perspective view of the animal water-closet of this invention.

Referring to the drawings, particularly FIG. 1, the animal water-closet 10 includes a frame 11, adapted to be positioned on the floor, and which has a platform area 12 upon which the animal is supported. A cutout is provided in the platform 12 for mounting a receptacle or bowl 13. Water conduit 14 wraps-around the upper portion of bowl 13 and includes a plurality of openings through which water passes for flushing bowl 13. The supply coupling 14a of water conduit 14 is routed rearward into the water cabinet 15 wherein a solenoid valve (not shown) is located.

The forward portion of the frame 11 includes an opening 16 through which the animal may enter the toilet area. On each side of the entry opening 16 is positioned a photoelectric system which detects the presence of an animal. More specifically, a light source 17 is provided on one side of opening 16 and a light sensitive cell 18 is provided on the other side. In this manner, as the animal enters into the water-closet, the light beam is interrupted and later recommunicates with cell 18 as the animal leaves the light beam. The manner in which this interruption actuates the flushing system will be more fully described below.

Basically, operation of the animal water-closet of this invention includes four functions, namely detection, delay, flush and reset. The detection phase of operation senses entry of the animal into the toilet area. The delay phase prevents the commencement of bowl washing until a predetermined period of time has elapsed since activation of the detection phase. A flush phase causes a bowl washing down action to occur. After another predetermined period of time, the reset function terminates the flushing action and places all functions not already reset in their quiescent state.

Very briefly, the detection portion of the circuit utilizes a light source, a light sensitive photocell and a semi-conductor trigger amplifer. When the beam of light is broken and then re-established, a trigger is generated which sets the delay circuit or electronic switch. The delay circuit activates a time action which is adjustable to accommodate different types and habits of the animals, a time of 5 minutes having been found quite acceptable with cats. At the end of the time period, the flushing mechanism is activated. The flushing mechanism includes a solenoid operated water valve controlled by a semi-conductor switch and relay, which causes water to be directed into the bowl 13 via the openings in tubing 14 disposed beneath the lip of platform 12, the openings being directed toward the waste pipe to insure complete washout of the bowl contents. When the flushing action is initiated, the delay function is reset and a second delay circuit is reactivated. The second delay circuit is also adjustable and at the end of the period of adjustment, the flushing action terminates. This adjustment in the second delay circuit accommodates variations in water pressure found in different geographical locations. After the flushing terminates the cycle is complete and the toilet is inactive until the next detection occurs.

Figure 2:
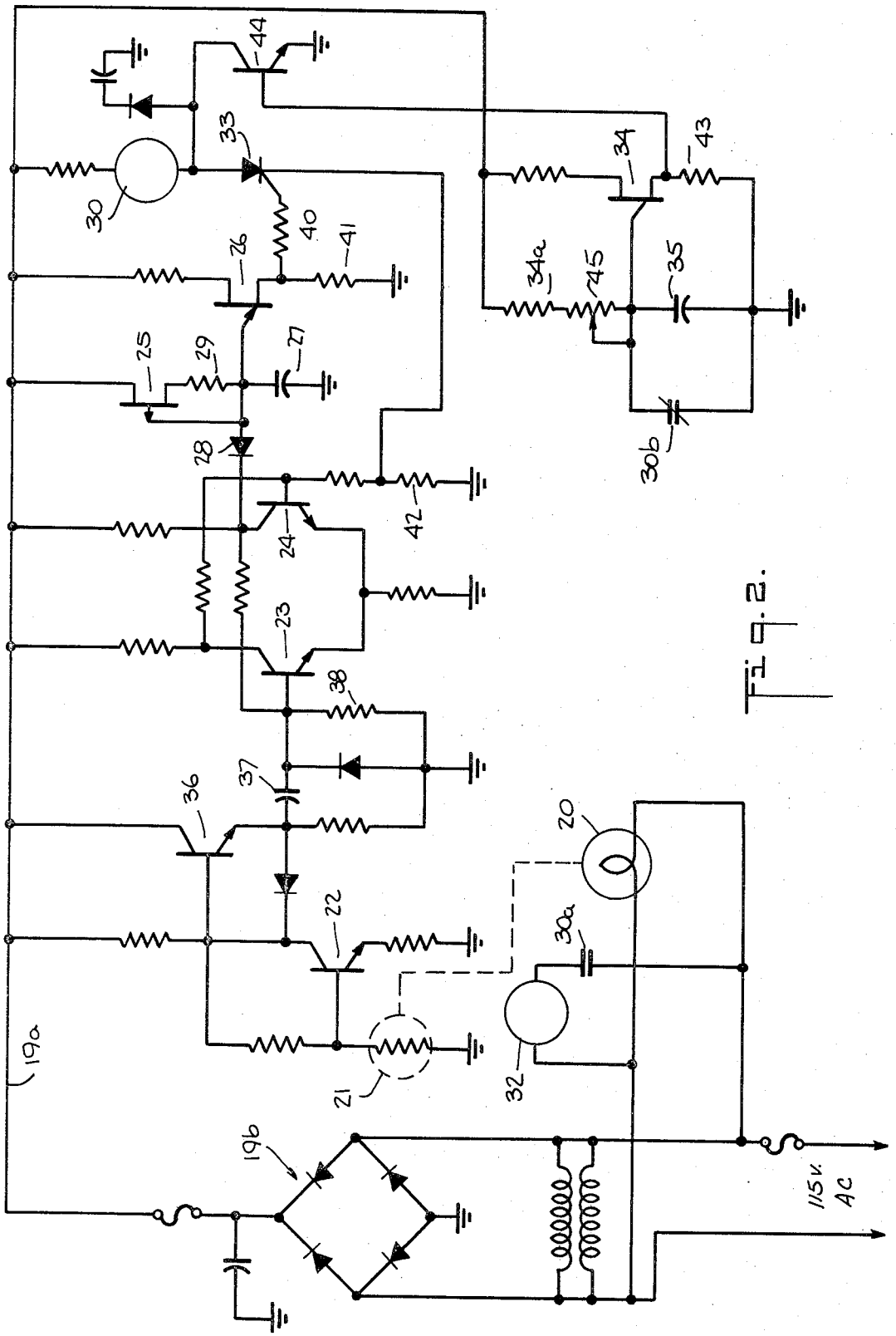
FIG. 2 is a schematic diagram of the electric circuit of one embodiment of this invention.

Now with specific reference to FIG. 2 of the drawings, the circuit of one embodiment of the invention will be more particularly described. The system is designed to operate on normal 115 volt household voltage which is used to produce a direct current voltage on line 19a via a rectifier circuit, such as the arrangement indicated at 19b. In the quiescent state, a light couple exists between light source 20 and the photocell 21, as indicated by the dotted line. At this stage, the value of the photocell 21 has a low resistance and the amplifier transistor 22 is near cutoff. The flip-flop consisting of transistors 23 and 24 with the associated resistors is in a reset condition with transistor 24 conducting. The delay circuit transistors 25 and 26, and the integrating capacitor 27 are in a disabled state by virtue of diode 28 holding the resistor 29-capacitor 27 junction at ground. Relay 30 has a normally open contact 30a and a normally closed contact 30b. The relay 30 and solenoid valve 32 are both de-energized since the silicon controlled rectifier 33 is in a non-conducting state. The flush timing control including transistor 34, resistors 34a, 45 and integrator 35, is disabled because of the clamp to ground through the normally closed contacts 30b of relay 30.

When the light couple between lamp 20 and photocell 21 is interrupted and then re-established due to an animal passing therethrough, during this time the photocell 21 has a relatively high resistance, the transistor 22 conducts, and a negative pulse appears at the emitter output of transistor 36. This pulse is differentiated by capacitor 37, resistor 38 and the input impedance of the flip-flop circuitry at the base of transistor 23. The trailing edge of the pulse results in a positive spike which causes transistor 23 to conduct and transistor 24 to cutoff. Transistor 24 cutting off releases the ground clamp on the delay circuit and capacitor 27 begins to charge through the field effect transistor 25 and resistor 29 combination acting as a constant current source. Transistor 26 is a unijunction type which conducts when capacitor 27 reaches a fixed voltage level, such as about 22 volts. Charge time is approximately 5–10 minutes. When transistor 26 conducts, the capacitor 27 is then discharged through resistors 40 and 41 and the silicon controlled rectifier 33. The current through the gate of silicon controlled rectifier 33 results in SCR conduction and energization of relay 30. The flow of current through the silicon controlled rectifier 33 also resets the flip-flop by virtue of the voltage developed across resistor 42, and re-applies the clamp to the resistor 29-capacitor 27 junction.

Energization of relay 30 closes the contacts 30a to activate solenoid 32 which is installed in the water conduit and thereby initiates the flushing action. The transistor 34 timing circuit is also activated by the opening of normally closed contacts 30b of relay 30. Capacitor 35 charges for a short period of time, approximately 10–20 seconds, until transistor 34 conducts and discharges capacitor 35 into resistor 43 and transistor 44. Current flow through the base of transistor 44 essentially applies a short across the silicon controlled rectifier 33. Current starvation causes the silicon controlled rectifier 33 to cutoff and the relay 30 to de-energize. Contacts 30a open and solenoid 32 is thereby de-energized stopping the flushing action. The clamp is re-established at the junction of resistor 45 and capacitor 35 with all circuit elements now being returned to their original or quiescent state.

An alternative circuit is illustrated in FIG. 3, which basically provides the same functions as the circuit previously described. This circuit in the quiescent state again has a light coupling existing between a lamp 50 and a photocell 51. The resistance value of the photocell 51 is now low and the voltage at the photocell 51-resistor 52 node is below the breakdown voltage of the zener diode 53. The silicon controlled rectifier 54 is nonconducting. The symmetrical integrator consisting of field effect transistor 55, resistors 56 and 57, capacitor 58 and diodes 59 and 60a, has established a voltage across capacitor 58 roughly equal to the supply voltage. The voltage between the gate of the field effect transistor 60 and the source places the device 60 well into its cutoff region. The base of transistor 61 is at ground potential; therefore, the transistor is cutoff and the relay 62 and solenoid 63 are de-energized.

When the light couple between lamp 50 and photocell 51 is broken, the voltage at the photocell 51 resistor 52 node rises above the zener voltage. The silicon controlled rectifier 54, selected for its sensitivity, requires very little current at the gate to cause conduction. When diode 53 breaks down and the silicon controlled rectifier 54 fires, the input to the symmetrical integrator drops to near zero volts, and transistor 55 conducts through diode 60a and resistor 56. This begins a very slow discharge of capacitor 58. When the voltage across capacitor 58 reaches a value within 4–6 volts of the transistor 60 source voltage, transistor 60 begins to conduct. As the capacitor 58 continues to discharge, the current through transistor 60 increases until transistor 61 conducts sufficient for relay 62 to pull-in.

Relay 62 is provided with normally open contacts 64, 65 and 66 and two normally closed contacts 67 and 68. When relay 62 pulls-in, three actions occur. First, contacts 64 and 65 close so that solenoid 63 becomes energized causing the flushing action to start. The normally closed contact 67 in the cathode circuit opens to cut off the silicon controlled rectifier 54. This raises the input to the integrator to near the supply voltage. Additionally, the gate of transistor 55 is transferred from the silicon controlled rectifier 54 to capacitor 58. In summary, the relay 62 has caused the energization of solenoid 63 via contacts 64 and 65 for starting of the water flow, the resetting of the silicon controlled rectifier 54, and the reversal of the current flow through the integrator. This current flow recharges capacitor 58; transistors 60 and 61 cutoff; the relay 62 and solenoid 63 drop out; and the circuit is now returned to its original quiescent state.

The animal water-closet of this invention as herein described provides for a completely automatic system which may be used by different sizes and weights of animals. This system is further characterized in that it includes features compatible with the habits of different kinds of animals.

Although the above description is directed to a preferred embodiment of the invention, it is noted that other variations and modifications will become apparent to those skilled in the art and may be made without departing from the spirit and scope of the present disclosure.

What is claimed:

1. An animal water-closet which comprises a receptacle, a horizontal platform adjacent said receptacle for supporting the animal, an upwardly extending partition attached to the perimeter of said horizontal platform, said upwardly extending partition being disposed about said perimeter of said platform so as to leave an opening at one side of said platform of a size sufficient to allow the animal entry and egress from said platform, water flushing means, a control valve connected to said water flushing means, a photoelectric system including a light source and light sensitive cell in communication therewith for sensing the presence of an animal in the water-closet, said photoelectric system generating a signal when the light beam emitted by said light source interrupted by the presence of the animal recommunicates with said light sensitive cell upon the animals exit from the light beam, said light source and light sensitive cell being disposed at opposite ends of said platform opening thereby insuring that the animal upon entry into said water-closet will be sensed by said photoelectric system, means for actuating said control valve, means for transmitting the signal generated by said photoelectric system to said control valve actuating means, and a time delay means interposed between said photoelectric system and said control valve actuating means for delaying actuation of said flushing means for a predetermined period so as to leave sufficient time for the animal to leave the water-closet.

* * * * *